United States Patent [19]

Billings

[11] Patent Number: 4,544,526

[45] Date of Patent: Oct. 1, 1985

[54] OVEN HEAT EXCHANGER

[75] Inventor: Bruce J. Billings, Northville, Mich.

[73] Assignee: Durr Industries, Inc., Plymouth, Mich.

[21] Appl. No.: 374,571

[22] Filed: May 3, 1982

[51] Int. Cl.⁴ .............................................. F01H 3/10
[52] U.S. Cl. ................................... 422/173; 422/176; 422/182; 422/220
[58] Field of Search ............... 422/176, 220, 173, 182; 432/72

[56] References Cited

U.S. PATENT DOCUMENTS

| 3,486,841 | 12/1969 | Betz | 422/173 |
|---|---|---|---|
| 3,597,166 | 8/1971 | Hochman | 422/220 |
| 3,836,338 | 9/1974 | Arnold | 422/182 |
| 4,140,625 | 2/1979 | Jensen | 422/220 |
| 4,322,386 | 3/1982 | Masutomi et al. | 422/176 |

Primary Examiner—Peter Chin
Attorney, Agent, or Firm—Cullen, Sloman, Cantor, Grauer, Scott & Rutherford

[57] ABSTRACT

An oven heat exchanger system which may be used in conjunction with painting ovens or similar processes. In conventional oven heat exchangers or the like, effluent gases exiting from a painting oven are received through a heating chamber, which causes the temperature of the oven effluent gases to rise to a level required for oxidation. The effluent then reacts with a catalyst to oxidize the effluent, in part, to $CO_2$ and $H_2O$. In the claimed invention, the heated effluent leaving the heating chamber enters an elbow duct in which spaced arcuate vanes are located. The curvature of the arcuate vanes are such that the heated effluent gases exiting the elbow duct is substantially laminar in flow. Heated effluent exiting the elbow duct is then received through a perforated plate which causes the heated effluent to be uniformly distributed as it enters a heater catalyst. The laminar flow of the heated effluent gas created by the elbow duct, and the uniform distribution of the heated effluent created by the perforated plate, increases the efficiency by which the hydrocarbons and other oxidizable substances in the oven effluent are oxidized by the heater catalyst and thereby increases the temperature of the oxidized effluent exiting the heater catalyst. This increase in temperature of the oxidized effluent increases the amount of heat which is transferred by the heat exchanger to ambient air entering the oven. As a result, the overall efficiency of the heat exchanger is increased, as less heat is needed to raise the temperature of ambient air entering the oven. In addition, the amount of unoxidized hydrocarbons vented to atmosphere is minimized, thus reducing environmental pollution.

3 Claims, 2 Drawing Figures

OVEN HEAT EXCHANGER

FIELD OF INVENTION

This invention relates to oven heat exchanger systems such as those which may be used in automotive painting processes. Prior to this invention, oven heat exchanger systems were less efficient, as the catalyst used to oxidize the effluent gases exiting from the oven did not fully react with a substantial proportion of the oven effluent as the flow of effluent gases over the catalyst was turbulent and unevenly distributed. These inefficiencies in oxidizing oven effluent gases resulted in the higher energy cost in operating the oven, as less heat was transferred to the ambient air entering the oven, and in large quantities of unoxidized oven effluents being vented to the atmosphere, thus polluting the environment. This invention greatly improves the efficiency with which oven effluents are oxidized, as the effluent gas flow is laminar and evenly distributed when it reaches the catalyst.

BACKGROUND AND SUMMARY OF THE INVENTION

Prior to this invention, the catalyst in oven heat exchanger systems did not react with a substantial portion of the effluent gases leaving the oven because the effluent flow over the catalyst was turbulent and unevenly distributed. This resulted in a higher energy cost in operating the oven, as less heat was transferred by the heat exchanger to ambient air entering the oven. In addition, quantities of unoxidized oven effluent gases were vented into the atmosphere. The invention improves the operation of the catalyst by creating a laminar, evenly distributed flow of effluent gases before the effluent gases contact the catalyst. The uniform and laminar flow increases the efficiency by which the catalyst oxidizes hydrocarbons and other oxidizable effluents, as more effluents can react with the catalyst when the flow is laminar and evenly distributed than when the flow is turbulent.

In the preferred embodiment of the invention, effluent gases are received from the oven and through a filter by a plug fan. The plug fan pushes filtered effluent gases into a heating chamber where the effluent gases are heated. The burner used in the heating chamber may incorporate flame spreaders to more evenly distribute the heat and avoid direct impingement of flame against the duct walls. Heated effluent gases exiting the heating chamber are received through a damper which allows heated effluents from the heating chamber to be vented directly into the atmosphere when desired (which would be done only during start up of the oven or under conditions where the heated effluent gases are safe to vent to the atmosphere). Heated oven effluent leaving the damper, when not vented to atmosphere, enter an elbow duct in which a plurality of spaced arcuate vanes are located. The arcuate vanes are located inside the elbow duct in such a way so that a vertical plane normally intersecting the vertical projections of the inside and outside curvature corresponding to the bend of the elbow duct would normally intersect the vertical projection of the arcuate vanes. In addition, the arcuate vanes are further located in the elbow duct in such a way as to normally deflect heated effluent gases entering the elbow duct to the opposing end of the elbow duct. Heated effluent gases leaving the elbow duct, which are now substantially laminar in flow, enter a perforated plate. The pressure drop occurring across the perforated plate tends to cause the effluent gas flow to be uniformly distributed before reacting with the heater catalyst. The heater catalyst oxidizes the hydrocarbons and other oxidizable substances in the effluent gases, which increases the temperature of the effluents and reduces the hydrocarbons to $CO_2$ and $H_2O$. The oxidized effluents then enter the hot side of the heat exchanger. The heat exchanger transfers the heat generated from oxidizing effluent gases to ambient air entering the cold chamber of the heat exchanger. The oxidized effluent gases exiting the hot chamber of the heat exchanger are then vented to atmosphere.

Ambient air enters the oven heat exchanger system through a filter which removes particulates. The ambient air is then received through a damper which controls the amount of filtered ambient air entering the cold chamber of the heat exchanger. As the filtered ambient air passes through the cold chamber of the heat exchanger, heat is transferred from the oxidized oven effluent entering the hot chamber of the heat exchanger to the ambient air. The heated ambient air exiting the cold chamber of the heat exchanger is then mixed with oven effluents which are received directly from the oven. The mixed oven effluent and the heated ambient air is then received through a filter into a second heating chamber. The burner used to heat the mixed oven effluent and heated ambient air many incorporate flame spreaders to evenly distribute the heat and avoid impingement of the flame against the duct walls. The burner operates intermittently to raise the temperature of the mixed effluents and heated ambient air to the level required for the particular painting process employed before the mixture is recirculated to the oven by a plug fan.

DETAILED DESCRIPTION OF THE DISCLOSURE

Figure 2:
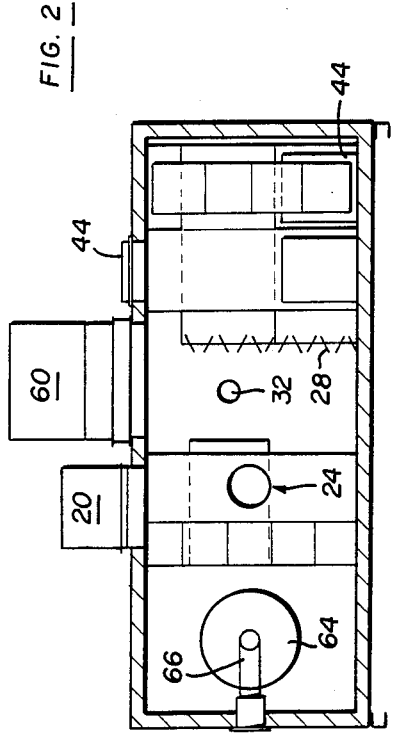
FIG. 2 is a side elevation of the embodiment shown in FIG. 1.
Figure 1:
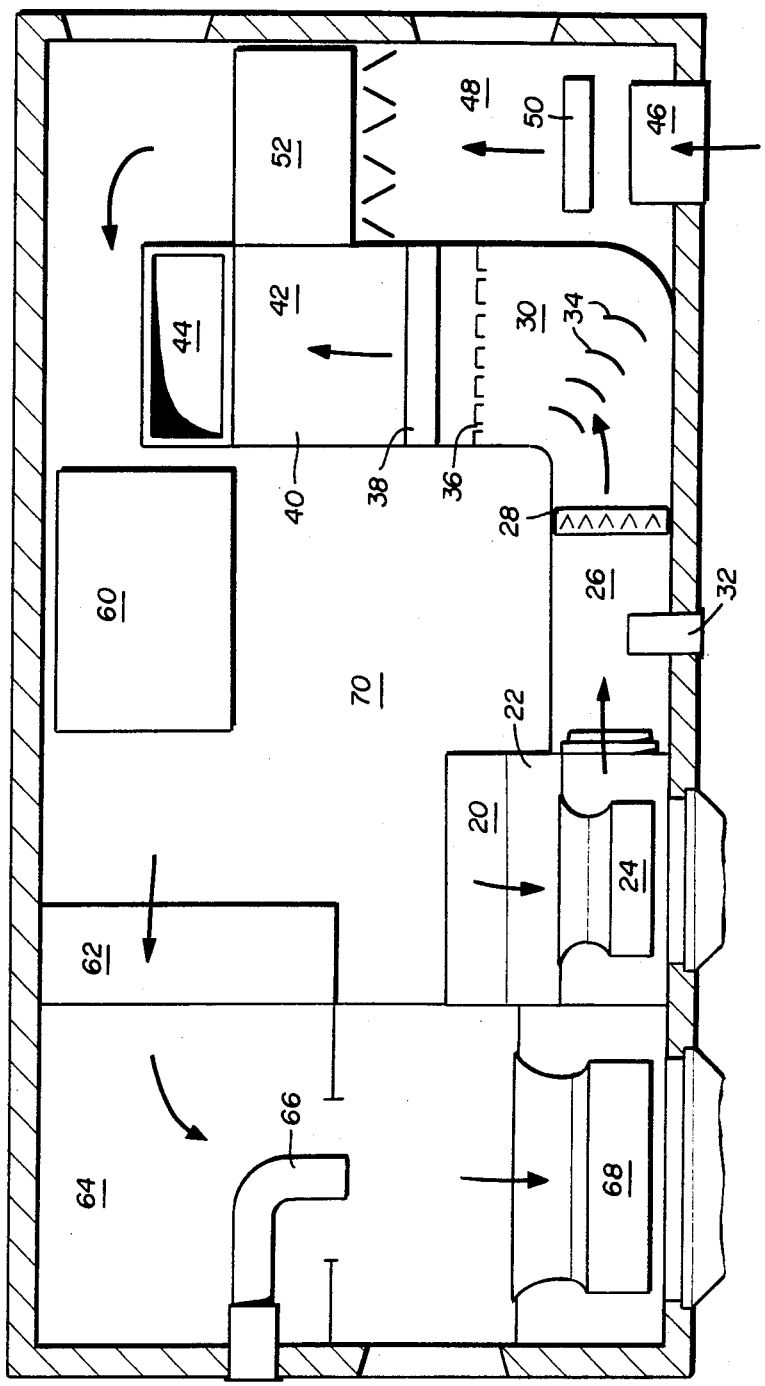
FIG. 1 is a top elevation of one embodiment of the oven heat exchanger system of this invention.

Oven effluent gases are received through duct 20 at a temperature of approximately 300° to 350° F., depending on the type of painting process employed. The effluent gases then pass through filter 22 and into plug fan 24. Plug fan 24 directs the filtered effluent gases into the heating chamber 26 where it is then, in normal operation, directed normally by damper 28 into elbow duct 30. The burner 32 of heating chamber 26 includes a flame spreader to evenly distribute heat and to avoid impingement of the flame against the duct walls. Effluent gas is heated by burner 32 to a temperature of approximately 600° to 800° F. Inside elbow duct 30 are located a plurality of arcuate vanes 34 which evenly distribute the heated effluent gases against perforated plate 36 and assure laminar flow of the effluents. Perforated plate 36 creates a pressure drop across the plate which increases the uniformity of flow of effluent gases prior to entering heater catalyst 38. Heater catalyst 38 oxidizes the solvents received from the paint oven, which normally include toluene, benzene, ethyl methyl ketone, to $CO_2$ and $H_2O$. The uniformity and laminar nature of the flow of the effluent gases assures burning of hydrocarbon and other oxidizable substances is complete. The oxidized effluent gases are then received in hot chamber 42 of heat exchanger 40 from heater catalyst 38 and the cooled, oxidized effluent exiting heat exchanger 40 is then discharged from the heat exchanger system through duct 44.

Ambient air having a normal temperature of approximately 70° F. is received through a fresh air filter 46 into chamber 48. The damper 50 controls the amount of ambient air allowed to enter chamber 48. The ambient air exiting chamber 48 enters cold chamber 52 of heat exchanger 40, where the ambient air is heated to 390° to 550° F.

Effluent gases directly from the oven are received through duct 60 and mixed with the heated ambient air from cold chamber 52 of heat exchanger 40 in mixing chamber 70. The mixed oven effluents and heated ambient air from mixing chamber 70 is received through filter 62 into the burner chamber 64, where burner 66 heats the mix to the desired temperature (which will depend upon the type of painting process employed). Plug fan 68 then transfers the heated mix to the oven.

Damper 28 may be operated to vent the heated effluent gas from the oven to chamber 26 directly into the atmosphere. This would be done only during start of the oven or conditions where the heated effluent gas is safe to vent to atmosphere.

The flow pattern of oven effluent and ambient air in the oven heat exchanger is as follows. Oven effluent flows into the oven heat exchanger through duct 20. Plug fan 24 pulls effluent gases from duct 20, through filter 24, and into burning chamber 26. After being heated by burner 32 in heating chamber 26, effluent gases enter elbow duct 30 passing through damper 28. Effluent gases entering elbow duct 30 flow over arcuate vanes 34, tending to cause the effluent flow exiting elbow duct 30 to be uniform and laminar in character. Elbow duct 30 communicates with perforated plate 36, which, because of the pressure drop created across the plate, increases the uniformity and laminar character of the effluent flow exiting perforated plate 36. Perforated plate 36 communicates with heater catalyst 38, which oxidizes the hydrocarbons in the effluent gas to $CO_2$ and $H_2O$. Heater catalyst 48 communicates with hot chamber 42 of heat exchanger 40. Oxidized effluent gases exiting hot chamber 42 of heat exchanger 40 are vented to atmosphere through duct 44.

Ambient air enters oven heat exchanger by passing through filter 46. Damper 50 is used to regulate the amount of ambient air passing from filter 46 to chamber 48. Chamber 48 communicates with cold chamber 52 of heat exchanger 40. Heated ambient air leaving cold chamber 52 of heat exchanger 40 is then mixed in mixing chamber 70 with effluent gases from oven drawn through duct 60. Mixed oven effluent and ambient air passes from mixing chamber 70 into burning chamber 64 through filter 62. Burner 66 located inside burning chamber 64 is used to heat mixed effluent and heated ambient air to the temperature required by the particular painting process employed. Plug fan 68 draws mixed ambient air and effluent from heating chamber 64 and recirculates the mixture to the oven.

The novelty resides primarily in the improved operation of the heater catalyst 38. Arcuate vanes 34 in elbow duct 30 tend to transform turbulent effluent gases entering elbow duct 30 into a uniform laminar flow. Perforated plate 36, which has one inch holes at two inch centers, increases the uniformity of the flow before the effluent gases reach heater catalyst 38 by creating a pressure drop across the plate. The uniformity and laminar quality of the effluent flow assures complete burning of the hydrocarbons and other oxidizable substances, improves the efficiency of the heat exchanger 40 by raising the temperature of the effluent entering the hot chamber of heat exchanger 40, and avoids hot spots on heater catalyst 38. Another improvement is the use of two flame burners, one located in the heating chamber 26 which initially heats the effluent gases before reaching heater catalyst 38 and the second burner 66 which is used only intermittently to heat the mixed oven effluent gases and ambient air to the required operating temperature prior to reforming to the oven. Under normal operating conditions, it is possible to use about 25% ambient air with the oven effluents which improves the overall efficiency of the heater. In addition, because filter 62 filters mixed oven effluent and heated ambient air before returning the mix to the oven, there is no need for a second filter inside the oven.

The catalyst 38 may be any conventional industrial oxidizing catalyst. A typical catalyst consists of a porous mesh in sheet form of a binder, such as a spun ceramic, impregnated with platinum. As shown, the catalyst is a porous sheet located opposite the perforated plate 36, generally perpendicular to the flow of the effluent oven gas. As described, the elbow duct and arcuate vanes 34 direct the effluent gas in laminar flow and the perforated plate assures even laminar distribution of the gas against the catalyst.

The following is a brief description of the common commercial elements of this invention. The plug fans 24 and 68 may be of the type commercially available from Chicago Blower having a capacity of 45,000 acfm. Burners 32 and 66 may be of the type which are available with flame spreaders from Eclipse Burner Corporation of Rockford, Ill. Heat exchanger 40 is a heat pipe-fluid transfer heat exchanger such as available commercially from Q Dot, located in Texas, Howden, Kalamazoo, Mich., and Hughes, located in California. A catalyst of the type described above is available from E I DuPont DeNemours & Co. and other suppliers.

This invention may be further developed within the scope of the following claims. Accordingly, the above specification is to be interpreted as illustrative only of a single operative embodiment of the present invention, rather than in a strictly limited sense.

I now claim:

1. An oven heat exchanger for recirculating oven gases having a heater catalyst means for oxidizing oven effluents and having a heating chamber means for raising the temperature of oven effluent gases prior to reacting with said heater catalyst, wherein the improvement comprises:

the heating chamber means having a flame heater located therein, said heating chamber means including means for receiving effluent oven gases from said oven and said heating chamber means terminating in a damper means for directing the oven gases to an elbow duct, said elbow duct communicating with said heating chamber for receiving the effluent oven gases through said damper means for recirculation, said damper means controlling the volume of oven gases received in said elbow duct, said elbow duct having a central arcuate bend portion, a plurality of spaced arcuate vanes located in said elbow duct such that an imaginary vertical plane normally intersecting the vertical projections of the opposed ends of said elbow duct corresponding to the bend portion in the elbow duct normally intersects the vertical projections of said arcuate vanes, said vanes further located in said elbow duct such that oven effluents entering said elbow duct are normally directed to the exit of said elbow duct, said elbow duct terminating in a straight linear portion have a perforated baffle means located therein, the perforations in said baffle means communicating with said elbow and said heater catalyst being porous and generally planar and located generally perpendicular to the flow exiting said perforated baffle, said vanes in combination with said perforated baffle creating generally laminar flow of said oven effluent gases evenly distributed across said catalyst, improving the efficiency of said catalyst and the distribution of said oven gases on said catalyst.

2. The oven heat exchanger for recirculating oven gases defined in claim 1, characterized in that the oven gases received from said catalyst are mixed with ambient air in a mixing chamber means and an intermittent flame heater means receiving the mixed effluent oven gases and ambient air in a heating chamber for adjusting the temperature of the gas prior to recirculation to the oven.

3. An oven heat exchanger system for recirculating oven gases, which comprises:

a duct means for supplying effluent gases from an oven to a heat exchanger for recirculation, said heat exchanger including a primary heating chamber having a heating means located therein for heating said effluent gas and said duct means communicating with said primary heating chamber which is used to raise the temperature of said effluent gas exiting said duct means, said primary heating chamber communicating with a heater catalyst means to oxidize hydrocarbons in said oven effluent, said primary heating chamber communicating with said heater catalyst through an elbow duct, said elbow duct having a bend portion and a plurality of spaced arcuate vanes located inside said elbow duct, said arcuate vanes located in said elbow duct such that an imaginary vertical plane normally intersecting the vertical projections of opposing ends of said elbow duct corresponding to the bend portion of said elbow duct normally intersect the vertical projections of said arcuate vanes, said arcuate vanes further located in said elbow duct such that oven effluents entering said elbow duct are normally directed to the exit of said elbow duct and said heater catalyst means having a reactive surface generally perpendicular to the flow of said oven effluent gases exiting said elbow duct, said vanes creating a laminar flow of said oven effluent gases received by said catalyst, improving the reaction of said oven effluent gases and the efficiency of said catalyst, said heater catalyst means communicating with a heat exchanger means used to transfer energy generated from oxidizing hydrocarbons in oven effluent to ambient air entering said heat exchanger means, said heat exchanger means communicating with a duct means exhausting oxidized oven effluent to the atmosphere, said heat exchanger means further communicating with a duct means receiving ambient air, said heat exchanger means further communicating with a mixing chamber means mixing heated ambient air with oven effluent supplied directly from said oven, said mixing chamber means further communicating with a duct means supplying said mixing chamber means with oven effluent, said mixing chamber means communicating with a secondary heating chamber heating mixed ambient air and oven effluent, said secondary heating chamber communicating with a duct means for returning mixed oven effluent and ambient air to the oven.

* * * * *